United States Patent

Matsuura et al.

[11] Patent Number: 5,956,426
[45] Date of Patent: Sep. 21, 1999

[54] MULTI-CODING APPARATUS

[75] Inventors: Yoko Matsuura, Tokyo; Shoji Shiomoto, Kanagawa, both of Japan

[73] Assignee: Sony Corporation, Tokyo, Japan

[21] Appl. No.: 08/967,077

[22] Filed: Nov. 10, 1997

Related U.S. Application Data

[63] Continuation of application No. 08/447,883, May 23, 1995.

[30] Foreign Application Priority Data

| May 31, 1994 | [JP] | Japan | 6-141235 |
| May 25, 1994 | [JP] | Japan | 6-135176 |

[51] Int. Cl.$^6$ .............. G06K 9/72; H04N 11/06
[52] U.S. Cl. ............ 382/239; 382/234; 382/232; 348/388
[58] Field of Search ............ 382/232, 234, 382/239, 236; 370/79, 80, 94.1, 112, 118; 348/388, 398

[56] References Cited

U.S. PATENT DOCUMENTS

| 4,386,237 | 5/1983 | Virupaksha et al. | 395/2.33 |
| 4,455,649 | 6/1984 | Esteban et al. | 370/522 |
| 5,115,309 | 5/1992 | Hang | 348/388 |
| 5,361,096 | 11/1994 | Ohki et al. | 348/387 |
| 5,416,521 | 5/1995 | Chujoh et al. | 348/411 |
| 5,506,844 | 4/1996 | Rao | 370/84 |

FOREIGN PATENT DOCUMENTS 0 510 929 A2  10/1992  European Pat. Off. ......... H04N 7/13

OTHER PUBLICATIONS

"Digital Image Processing", Rafael C. Gonzalez et al. pp. 238–239, 1977.

*Primary Examiner*—Thomas D. Lee
*Assistant Examiner*—Wengpeng Chen
*Attorney, Agent, or Firm*—Frommer Lawrence & Haug, LLP.; William S. Frommer

[57] ABSTRACT

It is intended to determine widths of quantization of respective encoders to prevent deterioration in quality of picture in its entire aspect. A multi-coding apparatus comprises a plurality of encoders $1a$ to $1n$ for coding input data at variable rates, a bit allocator 4 supplied with estimated amounts of codes output from the respective encoders $1a$ to $1n$, and a maximum transmission rate controller 3 for supplying a whole allocated amount of bits to the bit allocator 4 on the basis of the amounts of codes output from the respective encoders $1a$ to $1n$.

12 Claims, 7 Drawing Sheets

MULTI-CODING APPARATUS

This application is a continuation of application Ser. No. 08/447,883, filed on May 23, 1995.

BACKGROUND OF THE INVENTION

1. Field of the Invention

This invention relates to a multi-coding apparatus for encoding a moving picture, for example, in a compressed form and outputting it at a constant bit rate.

2. Description of the Related Art

There are proposed, for example, in U.S. Pat. No. 5,226,093 MPEG (Moving Picture Image Coding Experts Group) and MPEG2 (Moving Picture Image Coding Experts Group Phase 2) as high-efficient coding systems for coding image data into a compressed form by motion-compensative predictive coding and DCT-transformation. In MPEG and MPEG2, I pictures, B pictures and P pictures are sent in a predetermined sequence. For I pictures, video data are transmitted after being DCT-transformed and variable-length-coded. For B pictures, differential data from a current frame or field are sent in a DCT-transformed, variable-length-coded form. For P pictures, differential data between a current frame or field and a motion-compensated preceding frame or field are sent in a DCT-transformed, variable-length-coded form. In transmitting a digital video signal by MPEG or MPEG2, constant-rate control is performed for maintaining a substantially constant transmission rate. The control for establishing a constant bit rate is realized by taking one picture as a block, performing bit allocation for determining a target value for the amount of codes to be generated for each block, and controlling a quantizer in accordance with the target value.

Figure 1:
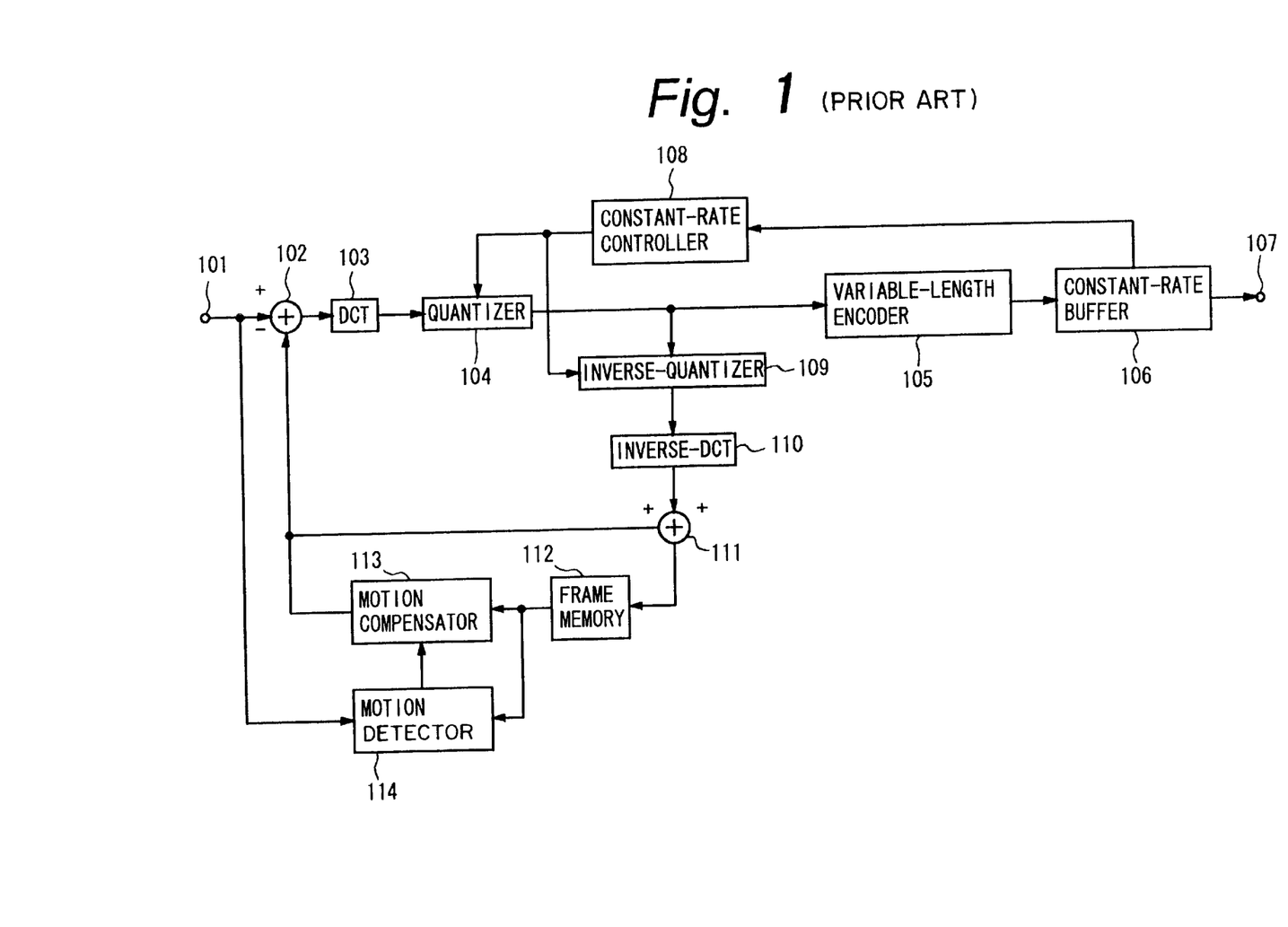
FIG. 1 is a block diagram of an existing coding apparatus.

FIG. 1 is a block diagram showing a coding apparatus. Current image data introduced through an input terminal 101 is supplied to a subtracter 102 and to a motion detector 114. The subtracter 102 subtracts output data of a motion compensator 113 from the current image data. Output of the subtracter 102 is DCT-transformed by a two-dimensional DCT converter 103 for (8×8) pixels, for example. DCT-transformed image data is quantized by a quantizer 104 and then supplied to a variable-length encoder 105 and to an inverse-quantizer 109. The variable-length encoder 105 changes the length of codes of data in accordance with the appearing occurrences of the data. The variable-length-coded data is supplied to a constant-rate buffer 106. The constant-rate buffer 106 supplies encoded data at a constant rate to an output terminal 107. Output of the constant-rate buffer 106 is also supplied to a constant-rate controller 108. The constant-rate controller 108 determines the scale of quantization for the quantizer 104. More specifically, the constant-rate controller 108 preliminarily allocates an amount of bits to be entered in the constant-rate buffer 106 by coding for a next unit region to be coded subsequently. To comply with the allocated amount of bits, the constant-rate controller 108 controls the width of quantization of the quantizer 104. As a result, encoded data is output from the constant-rate buffer 106 at a constant bit rate.

Output of the constant-rate controller 108 is also supplied to the inverse-quantizer 109. The image data given to the inverse-quantizer 109 undergoes inverse DCT transformation by an inverse-DCT transformer 110 in the opposite process from that executed by the quantizer 104. This data is supplied to an adder 111 and added to predictive image data of a reference frame also supplied to the adder 111 from the motion compensator 113. Output data from the adder 111 is supplied to a frame memory 112. Image data of the reference frame output from the frame memory 112 is supplied to the motion compensator 113 and to the motion detector 114.

Based on the current image data introduced from the input terminal 101 and the image data of the reference frame supplied from the frame memory 112, the motion detector 114 obtains a motion vector of the picture. Detection output from the motion detector 114 is supplied to the motion compensator 113. Based on the detection output from the motion detector 114 and the image data of the reference frame from the frame memory 112, the motion compensator 113 performs motion-compensative prediction. Predicted image data output from the motion compensator 113 is supplied to the subtracter 102 and to the adder 111.

Figure 2:
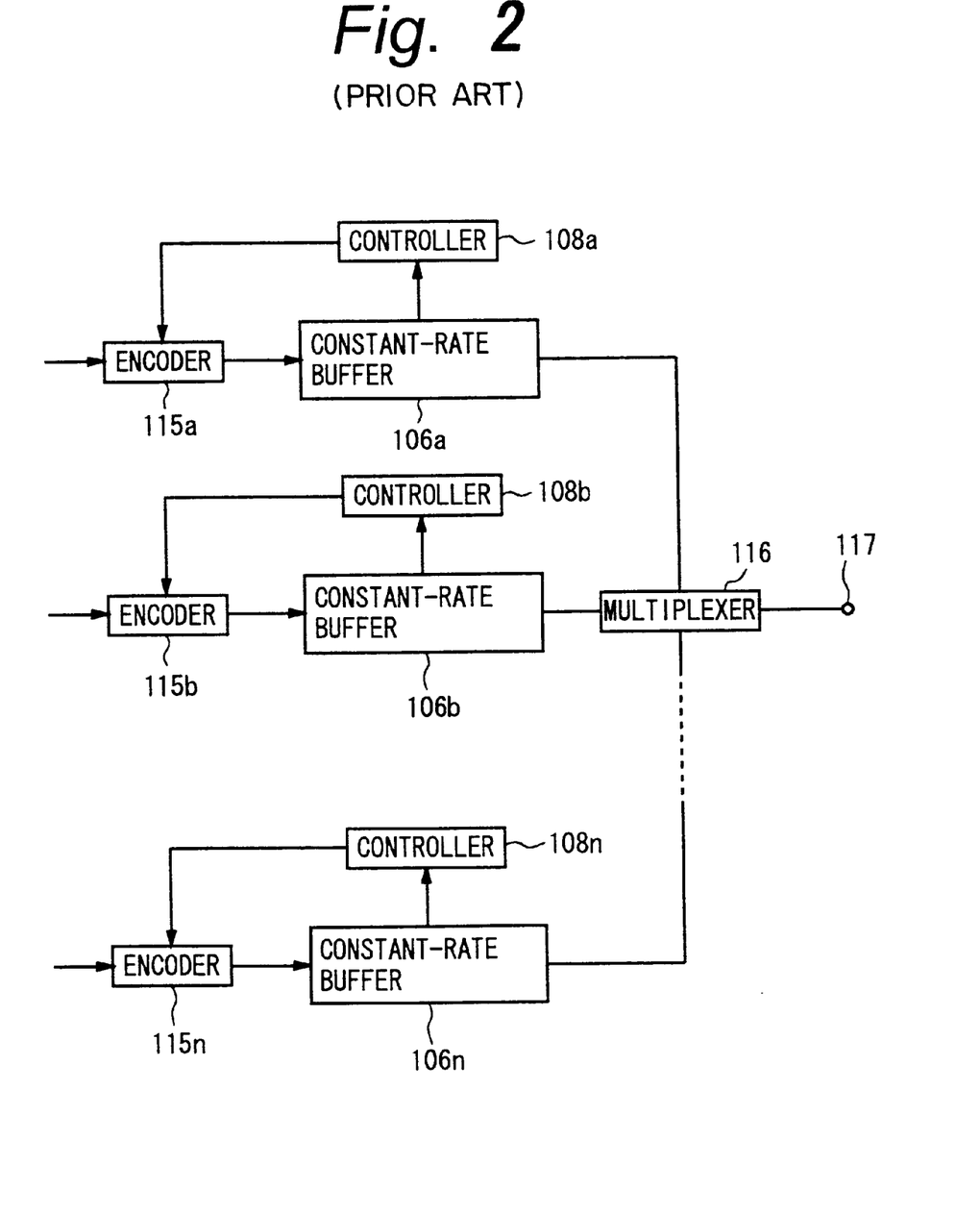
FIG. 2 is a block diagram showing an existing multi-coding apparatus.

When a plurality of sub-pictures are to be displayed simultaneously on a single picture plane (picture-in-picture display, multi-picture display, or the like), a plurality of such coding apparatuses are used. FIG. 2 shows a system comprising encoders corresponding to n pieces of input data, constant-rate buffers supplied with coded data output from respective encoders, constant-rate controllers for controlling widths of quantization of respective encoders on the basis of outputs from the constant-rate buffers, and a multiplexer supplied with outputs from respective constant-rate buffers. Each encoder in FIG. 2 comprises a DCT transformer, quantizer, or the like, which performs quantization or other processing of motion-compensated data in the same manner as described above.

The n pieces of input data are introduced to corresponding encoders 115a to 115n and encoded for each channel. Coded data processed by the encoders 115a to 115n are supplied to corresponding constant-rate buffers 106a to 106n. The constant-rate buffers 106a to 106n outputs the coded data at constant rates. Outputs of the constant-rate buffers 106a to 106n are also supplied to corresponding constant-rate controllers 108a to 108n. The constant-rate controllers 108a to 108n allocate appropriate amounts of bits to be entered in respective constant-rate buffers 106a to 106n from respective encoders 115a to 115n for a next unit region for coding. The constant-rate controllers 108a to 108n supply control data to the encoders 115a to 115n to control the widths of quantization in accordance with the allocated amounts of bits. As a result, data of respective channels are output from respective constant-rate buffers 115a to 115n at constant rates.

In transmitting a digital video signal by MPEG or MPEG2, constant-rate control is performed for maintaining a substantially constant transmission rate. The control for establishing a constant bit rate conventionally relies on taking one picture as a block, performing bit allocation for determining a target value for the amount of codes to be generated for each block, and controlling a quantizer in accordance with the target value.

Figure 3:
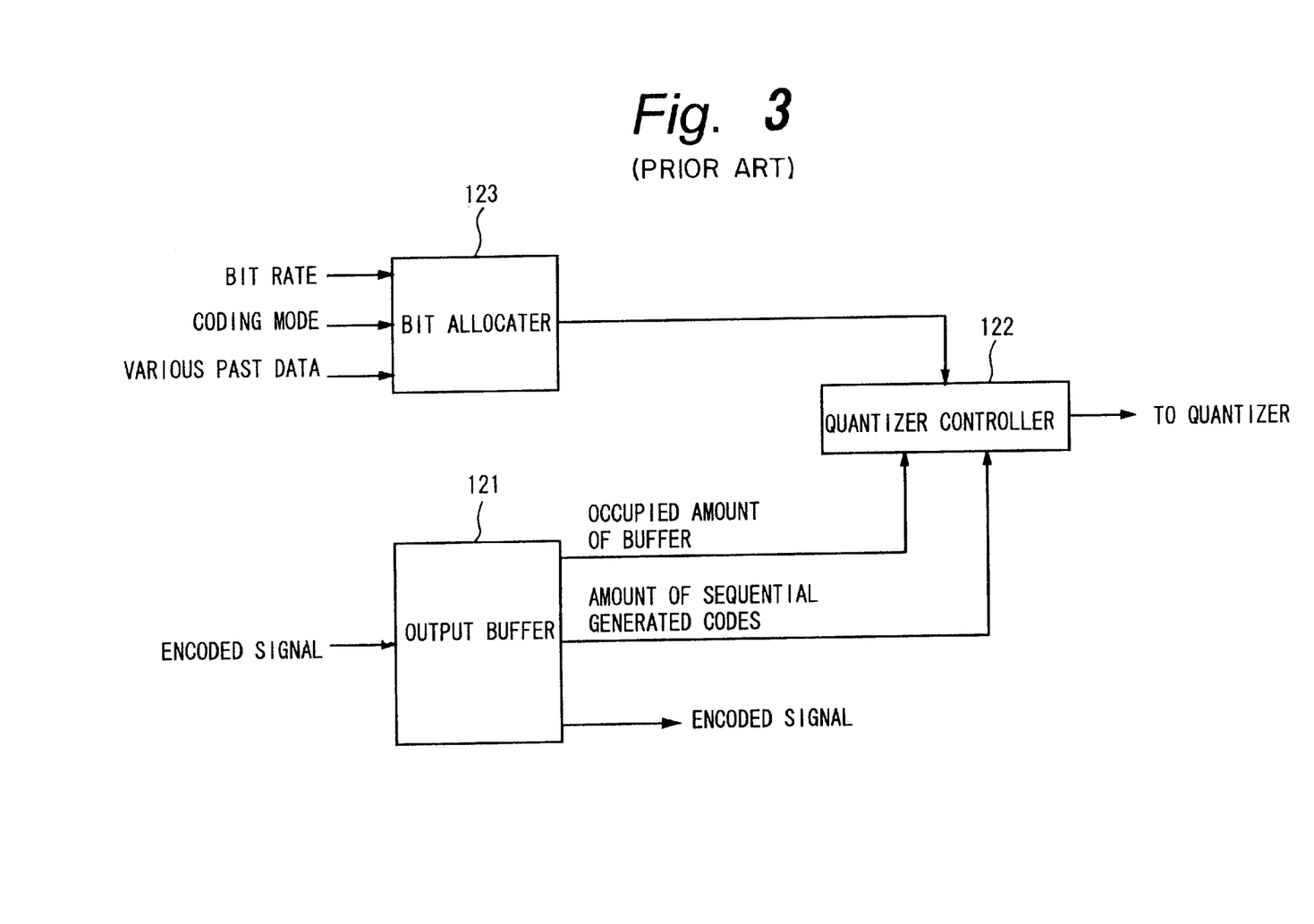
FIG. 3 is a block diagram of an existing coding apparatus.

That is, as shown in FIG. 3 showing a conventional system, encoded video data are supplied to an output buffer 121. Data on the buffer capacity of the output buffer 121 and data on the amount of sequential generated codes are supplied to a quantizer controller 122. A bit allocator 123 is supplied with data on the bit rate, coding mode, and various past data obtained by actual coding operations. Referring to these data, namely, bit rate, coding mode, and various past data obtained by actual coding operations, the bit allocator 123 determines a target amount of codes to be generated for a subsequently coded block, and allocates an appropriate number of codes. Output from the bit allocator 123 is supplied to the quantizer controller 122. The quantizer controller 122 controls the quantizer on the basis of data sent from the buffer 121 to indicate the occupied amount of the buffer, data on the amount of sequential generated codes in one block, and data sent from the bit allocator 123 to inform of the amount of bits allocated to the entire block. The control for establishing a constant bit rate is thus attained.

As explained above, encoded data of respective channels are output at constant rates. That is, encoded data made by multiplexing outputs of respective channels is output at a constant rate without exceeding the maximum capacity of the transmission channel. When multi-coded data is transmitted, each channel outputs its data in a quantized form at a constant bit rate even when respective sub-pictures have different amounts of data at a specific point of time. Therefore, data of respective channels, which will be reproduced into sub-pictures with different qualities depending on their bit rates, are multiplexed and sent out. Assume here, for example, that all sub-pictures, multiplexed, are equal in dimension. If a common output rate is given to all channels of these multiplexed sub-pictures and if amounts of pre-coded data are different for respective channels, respective divisional sub-pictures will be different in amount of reduction of quantized data. This makes it impossible to maintain a uniform subjective quality of the reproduced sub-pictures over the entire picture plane. Additionally, if the respective sub-pictures are different in entropy, a large difference may exist in amount of reduction of information between the respective sub-pictures, due to the code amount reducing function by quantization, which may invite an unbalanced subjective quality of picture among these reproduced sub-pictures. Such differences in subjective quality of picture among respective sub-picture planes is liable to decrease the quality of picture as a whole.

In view of the problems discussed above, it is an object of the invention to provide a multi-coding apparatus capable of quantizing each input data at an independent variable rate and hence preventing deterioration of the quality of picture.

Moreover, as explained above, the control for establishing a constant bit rate conventionally relied on bit allocation using past data. This method, however, sometimes falls in inadequate bit allocation when pictures include a change of scene; when image data including violent and quick motions are to be encoded; or when audio signals having small correlations between adjacent unit regions for coding are to be encoded. This makes it difficult to generate an appropriate amount of codes in compliance with the nature of block data variable from time to time, and hence invites deterioration in quality of reproduced signals.

It is therefore another object of the invention to provide a coding apparatus capable of generating an appropriate amount of codes in compliance with the nature of block data variable from time to time by executing bit allocation using estimated data for future blocks coming after a block currently under the coding process.

SUMMARY OF THE INVENTION

According to the invention, there is provided a multi-coding apparatus, comprising: a plurality of encoders for coding input data at variable rates; a bit allocator to which estimated amounts of codes are supplied from respective said encoders; and a maximum transmission rate controller for supplying a whole allocated amount of bits to the bit allocator on the basis of the amounts of codes output from the respective encoders, the bit allocator controlling the respective encoders on the basis of the estimated amounts of codes and the allocated amount of bits.

According to the invention, there is provided a coding apparatus configured to supply a coded output at a constant bit rate by determining a target value for the amount of codes to be generated for each block comprising a data region of a predetermined dimension and by controlling a quantizer to comply with the target value, comprising: estimating from time to time the amount of codes to be generated for respective future blocks coming after a block currently under the coding process; and means for giving a target value for the amount of codes to be generated for a subsequent block by using the estimated amount of codes, the quantizer being controlled in response to the target value to issue coded outputs at a constant bit rate.

Input data are encoded by the variable-rate encoders. A respective one of the variable-rate encoders supplies an estimated amount of codes to the bit allocator 4. The amount of codes output from each variable-rate encoder is supplied to the maximum transmission rate controller. The maximum transmission rate controller determines an allocated amount of bits for the entire channels on the basis of the amounts of codes supplied. The allocated amount of bits is supplied to the bit allocator to calculate allocated amounts of bits to be supplied to respective variable-rate encoders with reference to the estimated amounts of codes and the whole amount of codes.

By estimating the amount of codes to be generated for a plurality of future blocks and by using the estimated amount of codes, the next bit allocation is conducted. Therefore, bit allocation always complies with the nature of pictures of future blocks which varies from time to time.

According to the invention, by outputting coded data from each channel at a variable rate and by limiting the maximum value of the total output multiplexing outputs of the respective channels, multi-picture transmission can be realized with balanced amounts of reduction of information among respective channels. As a result, differences in subjective quality among respective reproduced sub-pictures can be minimized, and deterioration in quality of picture as a whole can be prevented.

According to the invention, next allocation of bits is done by estimating amounts of codes to be generated for a plurality of future blocks. As a result, the allocation of bits complies with the nature of pictures of future blocks which varies from time to time. For example, in case of a scene change from a picture having a relatively small amount of information to a picture having a relatively large amount of information, the existing method of bit allocation using only past data temporarily invites a deterioration in the quality of pictures because of the amount of bits allocated immediately after the scene change being too small; however, the present invention can prevent such a temporary deterioration by allocating the most appropriate number of bits for the scene, chosen from estimated numbers of bits for estimated blocks.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 4:
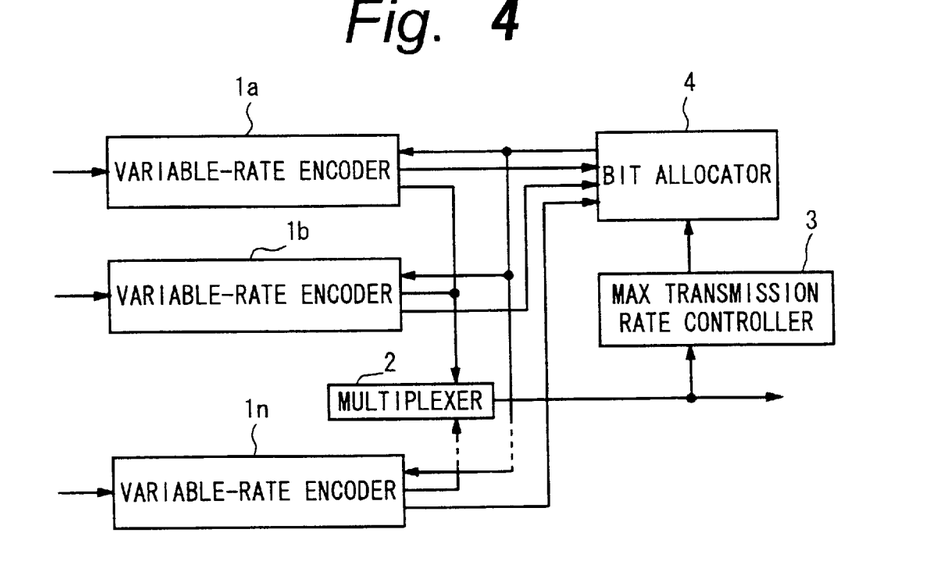
FIG. 4 is a block diagram of a multi-coding apparatus according to the invention.

An embodiment of multi-coding apparatus according to the invention is explained below with reference to the drawings. FIG. 4 is a block diagram of a multi-coding apparatus according to the invention. The multi-coding apparatus comprises n variable-code encoders 1a to 1n to which n input data are supplied, respectively; a multiplexer 2 to which encoded data are supplied from the variable-rate encoders 1a to 1n; a maximum transmission rate controller 3 to which multiple data multiplexed by the multiplexer 2 are supplied; and a bit allocator 4 to which supplied are an allocated amount of bits from the maximum transmission rate controller 3 and estimated amounts of codes from the variable-rate encoders 1a to 1n. The bit allocator 4 supplies allocated amounts of bits to the variable-rate encoders 1a to 1n on the basis of the supplied data. Assume here that output data of a motion compensator is subtracted from the input data in each of the variable-rate encoders 1a to 1n, and the resulting data is encoded.

Each of the variable-rate encoders 1a to 1n executes coding process onto image data, and thereafter supplies it to the multiplexer 2 as data encoded at variable rates. The data output through the multiplexer 2 is sent to the maximum transmission rate controller 3. The maximum transmission rate controller 3 allocates an amount of bits to the entire channels in the next unit region for coding in compliance with the whole amount of codes, which is the sum of amounts of codes supplied from the respective channels in a unit region. This prevents the allocated amount of bits from exceeding the predetermined maximum capacity of the transmission channel. The bit allocator 4 is also supplied with estimated amounts of codes from the variable-rate encoders 1a to 1n and the whole allocated amount of bits for the entire channels sent from the maximum transmission rate controller 3. Based on these data, the bit allocator 4 supplies allocated amounts of bits to the respective variable-rate encoders 1a to 1n.

Figure 5:
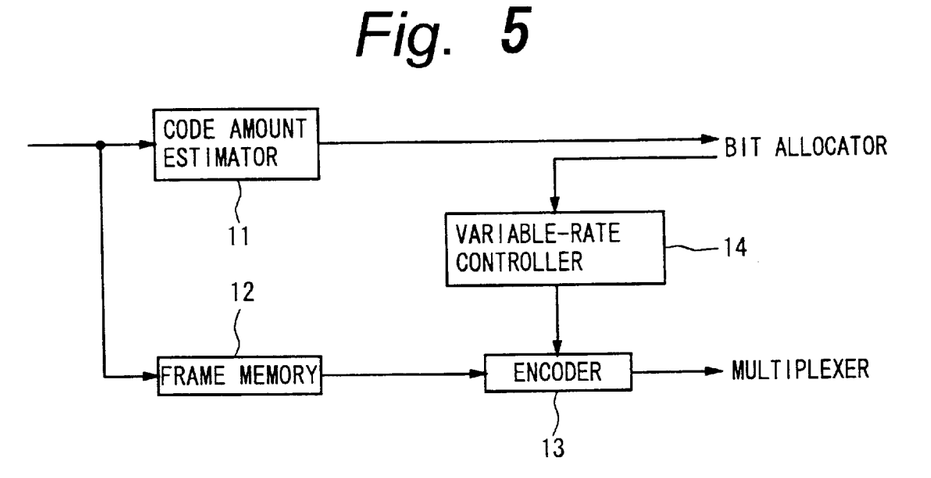
FIG. 5 is a block diagram showing a variable-rate encoder in greater detail.

FIG. 5 is a block diagram showing one of the variable-rate encoders in greater detail. Input data is supplied to a code amount estimator 11 and to a frame memory 12. The code amount estimator 11 calculates the entropy of the input data and counts the amount of codes generated in each unit region for coding when a common width of quantization is given. From this, an estimated amount of codes of the input data is predicted. Output of the code amount estimator 11 is given to the bit allocator 4.

On the other hand, the data is delayed by one frame in the frame memory 12 in order to give time for the code amount estimator 11 to estimate the amount of codes. Output data from the frame memory 12 is supplied to and encoded by the encoder 13. Meanwhile, the whole allocated amount of bits for the entire channels in a next unit region for coding is output from the bit allocator 4 to a variable-rate controller 14. The whole allocated amount of bits is taken as a target output value of an encoder 13. The variable-rate controller 14 supplies control data based on the whole allocated amount of bits in order for the encoder 13 to change the width of its quantization. In this manner, the controller 14 controls the encoder 13 to issue coded data at a constant bit rate.

Figure 6:
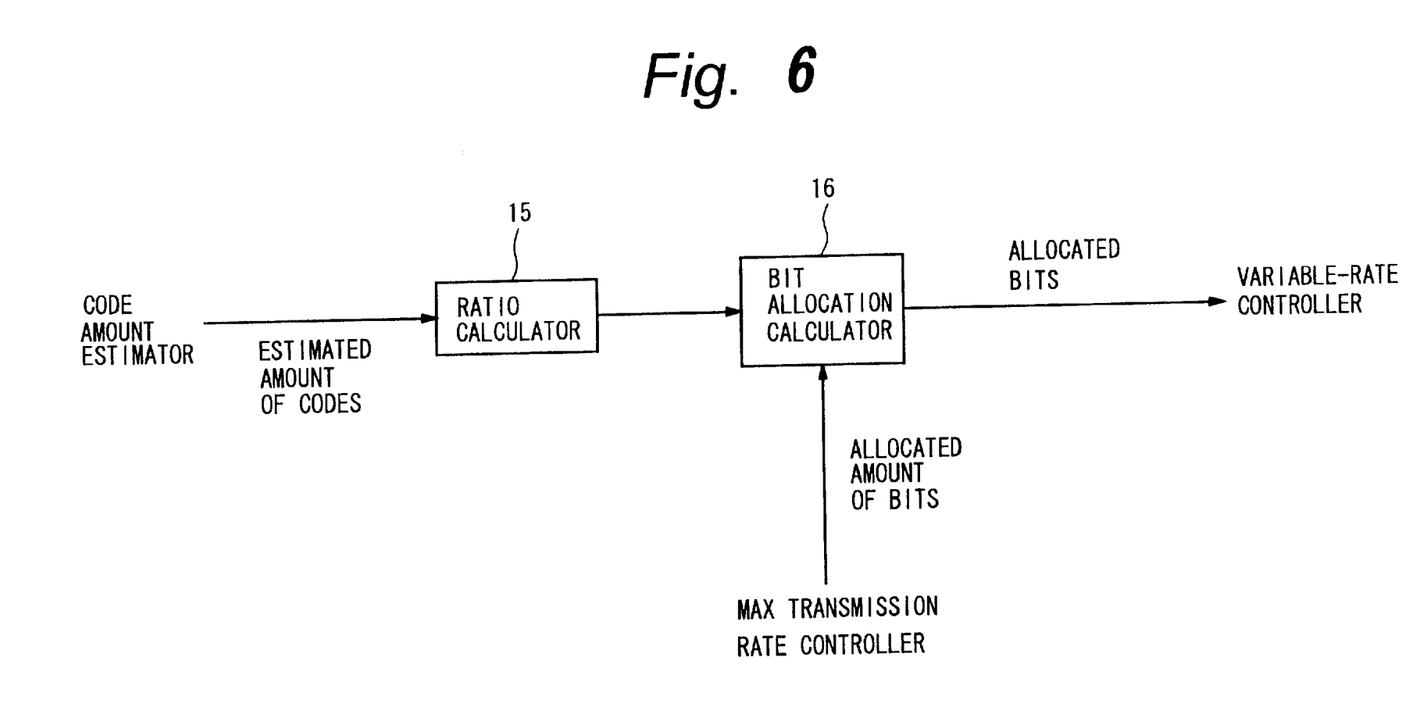
FIG. 6 is a block diagram showing a bit allocator in greater detail.

FIG. 6 is a block diagram showing the bit allocator 4 in greater detail. The bit allocator 4 comprises a ratio calculator 15 for calculating the rate for generating codes and a bit allocation calculator 16. The ratio calculator 15 is supplied with estimated amounts of codes from the respective code amount estimators 11. The ratio calculator 15 calculates the rates for generating codes on the basis of the estimated amount of codes. The rates for generating codes represent amounts of codes generated in respective channels, relative to the whole amount of codes generated by the entire channels. In addition, the rates for generating codes are calculated as, for example, ratios of respective channels so as to allocate bits in accordance with the ratios. Calculation output of the ratio calculator 15 is supplied to the bit allocation calculator 16. The bit allocation calculator 16 is supplied with the whole allocated amount of bits for the entire channels, sent from the maximum transmission rate controller 3, and executes a predetermined calculation based on the calculation output from the ratio calculator 15 and the whole allocated amount of bits. As a result of the calculation, allocated amounts of bits to be distributed to respective channels are obtained. These allocated amounts of bits are sent to the respective variable-rate controllers 14.

Figure 7:
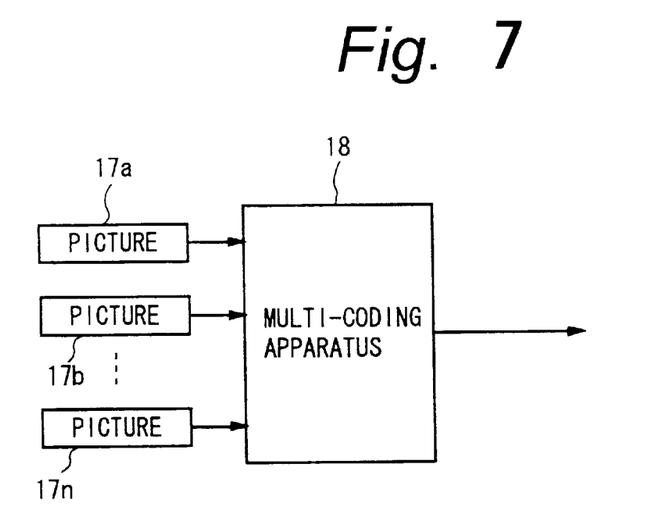
FIG. 7 is a block diagram of a multi-picture transmission system using the multi-coding apparatus according to the invention.

FIG. 7 is a block diagram showing a multi-picture transmission system using the multi-coding apparatus shown in FIG. 4. If the number of channels and the maximum channel capacity for the entire channels are predetermined in the multi-picture transmission system, rates of output bits of respective channels are not contracted definitely. A plurality of multiple data 17a to 17n from respective channels are supplied to a multi-coding apparatus 18. The multi-coding apparatus 18 executes the above-explained processing. That is, the apparatus 18 first estimates amounts of codes to be generated for respective channels, then determines the ratio of bits to be generated for the respective channels by calculation based on the estimated amounts of codes, and then calculates allocated bits for variable-rate controllers of respective channels on the basis of the ratio of bits. Thus a uniform subjective quality of picture can be maintained over the entire picture plane, and a high quality of picture can be maintained.

Figure 8:
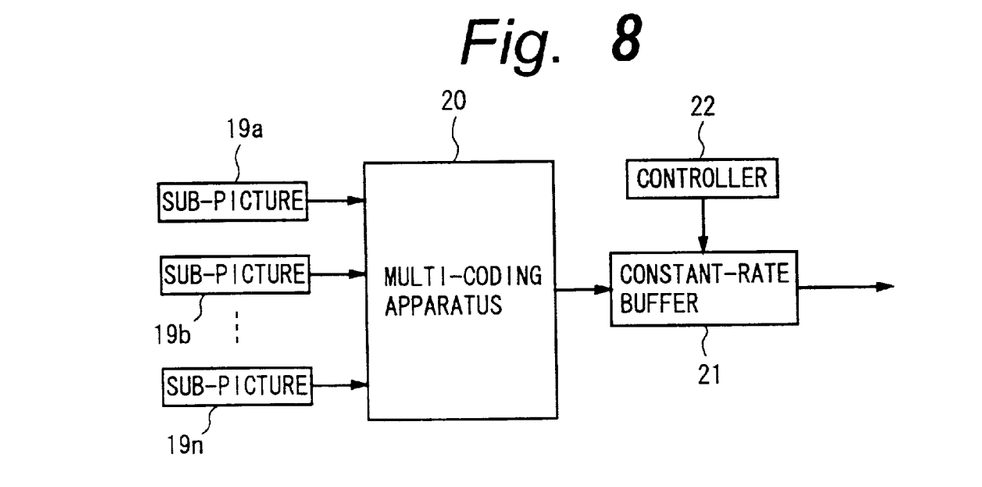
FIG. 8 is a block diagram of a modified version of the multipicture transmission system.
Figure 9:
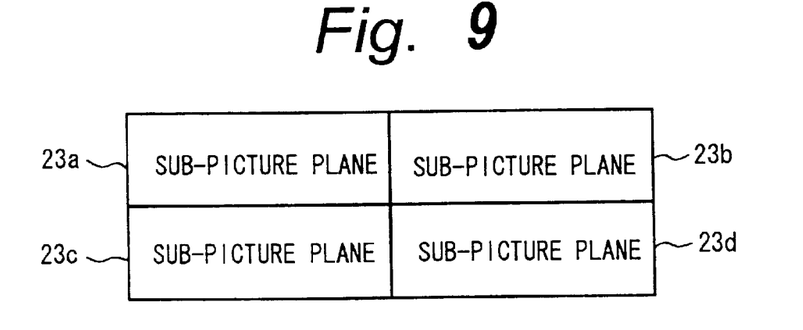
FIG. 9 is a diagram of a picture plane divided into sub-picture planes.

FIG. 8 is a block diagram showing a modified version of the multi-picture transmission system shown in FIG. 7. In FIG. 8, input data 19a to 19n of sub-pictures for a plurality of divisional sub-picture planes made by equally dividing a single picture plane are supplied to a multi-coding apparatus 20. In this example, one picture plane is divided into quarters (23a to 23d) as shown in FIG. 9, and the input data 19a to 19n shown in FIG. 8 correspond to four input data 23a to 23d. The multi-coding apparatus 20 executes the above-explained processing. Encoded data from the multi-coding apparatus 20 is supplied to a constant-rate buffer 21. The constant-rate buffer 21 is supplied with control data from a constant-rate controller 22 to restrict the maximum amount of the coded data sent onto the transmission line from the multi-coding apparatus 20. In this manner, by supervising the buffer capacitance for the constant-rate buffer 21 by using the constant-rate controller 22, the occupied amount of buffer can be suppressed within a predetermined range, and output at a constant bit rate can be realized. As explained above, since images for respective divisional sub-picture planes can be encoded at variable rates, images can be transmitted at a constant bit rate, and differences in quality of picture among the sub-picture planes can be minimized.

Figure 10:
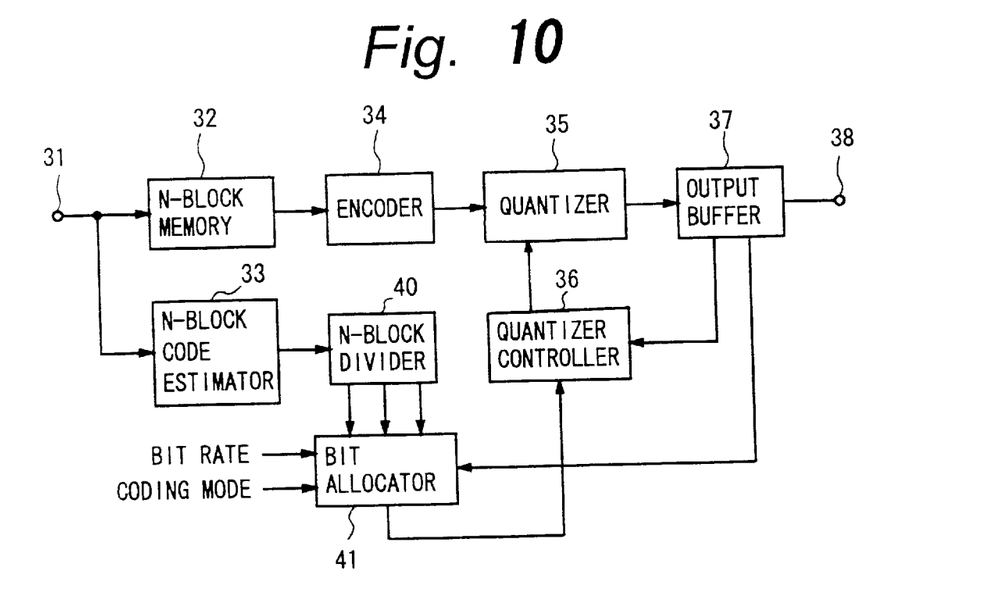
FIG. 10 is a block diagram of an embodiment of the invention.

An embodiment of the invention is described below with reference to the drawings. FIG. 10 shows the embodiment of the invention. In FIG. 10, video data introduced from an input terminal 31 is supplied to a memory 32 and to a code amount estimator 33. The memory 32 stores video data of future n blocks (each block corresponding to one picture) to be encoded subsequently. The code amount estimator 33 estimates the amount of codes corresponding to the video data of the future n blocks when encoded.

Output from the memory 32 is supplied to an encoder 34. The encoder 34 encodes video data into a compressed form by motion-compensative predictive coding and DCT. Coding modes include a mode for I pictures, mode for B pictures and mode for P pictures. In the mode for I pictures, video data is DCT-transformed within a frame of field. In the mode for B pictures, differential data between a current frame or field and motion-compensated preceding and subsequent frames or fields is DCT-transformed. In the mode for P pictures, differential data between a current frame or field and a motion-compensated preceding frame or field is DCT-transformed.

Output from the encoder 34 is supplied to a quantizer 35. The width of quantization of the quantizer 35 is controlled by a quantizer controller 36 as explained later. Output from the quantizer 35 is supplied to an output buffer 37. Output data is controlled by the output buffer 37 to outflow at a constant rate. Output of the output buffer 37 is supplied through an output terminal 38.

The code amount estimator 33 estimates the amount of codes for video data of future n blocks. That is, since video data from the input terminal 31 is given to the encoder 34 via the memory 32 of n blocks, what is estimated by the code amount estimator 33 is the amount of codes to be generated for future n blocks subsequent to a currently encoded block. Output from the code amount estimator 33 is supplied to a block divider 40, and the amount of codes are divided into those for respective blocks by the block divider 40. The estimated values of amounts of codes for respective blocks are supplied to a bit allocator 41.

Supplied to the bit allocator 41 are data indicating a bit rate and data indicating a coding mode. The bit allocator 41 is also supplied with data on the amount of codes generated from time to time from the output buffer. The bit allocator 41 is further provided with amounts of codes to be generated for future n blocks. The bit allocator 41 allocates an amount of bits to a block to be subsequently encoded, with reference to the bit rate, coding mode and estimated amounts of codes for future n blocks.

Output from the bit allocator 41 is supplied to the quantizer controller 36. Based on the bit allocation from the bit allocator 41, the quantizer controller 36 determines the width of quantization by a quantizer 35, and establishes a constant rate.

Figure 11:
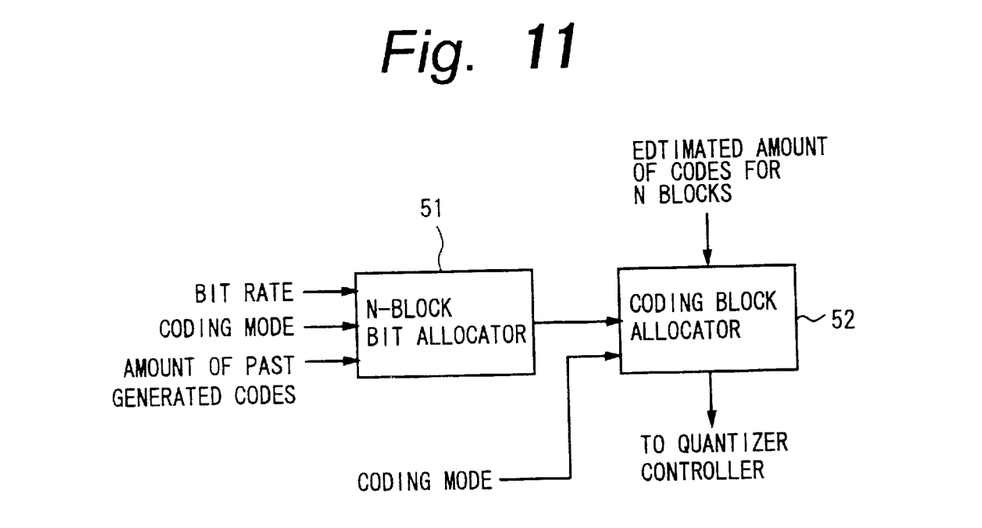
FIG. 11 is a block diagram showing an arrangement of bit allocator in the embodiment of the invention.

FIG. 11 shows a specific arrangement of the bit allocator 41. In FIG. 11, numeral 51 denotes a bit allocator for n blocks. The n-block bit allocator 51 determines an acceptable amount of codes to be generated for n blocks, with reference to the bit rate, coding mode, and amounts of codes generated for respective past blocks. A coding block allocator 52 subsequent to the n-block bit allocator 51 determines how the bits for n blocks obtained by the n-block bit allocator 51 should be divided for subsequent blocks, with reference to the estimated amounts of codes to be generated for the future n blocks and the coding mode of the subsequent blocks, and executes appropriate bit allocation.

More specifically, the initial number of bits R[0] on transmitting data for n pictures is given by:

$$R[0] = \text{Bit Rate} \times n/\text{PRATE} \tag{1}$$

where Bit Rate is the bit rate given, and PRATE is the number of pictures per unit time.

If, for example, 30 pictures are sent per second at the transmission rate of 20 Mbps, then the initial number of bits R[0] on transmitting data for 15 pictures is:

$$R[0] = 20000000 \times 15/30 = 10000000 \text{ bits}$$

When the number of pictures having the I coding mode among n pictures is 1, and those having the P coding mode is p, then the number of pictures having the B coding mode is:

$$b = n - 1 - p$$

Assuming that the ratio of bits allocated to the pictures (I, P, B) is:

$$g[I] \cdot g[P] \cdot g[B]$$

according to their coding modes, the number of allocated bits R[t] for n pictures at a point of time t is renewed for each picture by the following equation:

$$R[t] = R[t-1] - S - R[O] \times g[\text{type}]/(g[I] + g[P] \times P + g[B] \times (n-p-1)) \tag{2}$$

where S is the amount of codes to be generated for one picture by the immediately preceding coding process, and "type" is I, P or B.

If, for example, $$g[I] \cdot g[P] \cdot g[B] = 4:2:1$$

then revised equations of numbers of bits R[t] for 15 pictures at the point of time t appear as follows:

$$R[t] = R[t-1] - S + 4/21 \, xR[0]$$
$$= R[t-1] - S + 1904762 [\text{bits}](\text{type} = I)$$

$$R[t] = R[t-1] - S + 2/21 \, xR[0]$$
$$= R[t-1] - S + 952380 [\text{bits}](\text{type} = P)$$

$$R[t] = R[t-1] - S + 1/21 \, xR[0]$$
$$= R[t-1] - S + 476190 [\text{bits}](\text{type} = B)$$

The n-block bit allocator 51 executes operations based on Equations (1) and (2).

After that, bit allocation for next pictures is done by using the estimated amounts EBit[1], EBit[2], . . . EBit[n] for n pictures. For example, since the estimated amount of code for a picture for the next coding is EBit[1], the bit allocation for the next one picture can be determined by obtaining the ratio of EBit[1] in the entire n pictures and by multiplying it by R[t] obtained by Equation (2). Note, however, estimated amounts of codes, EBit[1], EBit[2], . . . , EBit[n] are corrected by multiplying them by weighing coefficients predetermined for respective predictive modes. That is, the amount of allocated bits, ABit, for the next one picture is obtained by:

$$ABit[t]=R[t]\times(k1\times EBit[1])/(k1\times EBit[1]+\ldots+kn\times EBit[n]) \quad (3)$$

where k1 . . . kn are coefficients determined for respective predictive modes. The n-block bit allocator 51 executes operations based on Equation (3).

As explained, the bit allocator 41 performs code allocation by using future blocks coming after a block under current coding process. Based on this, the width of the quantization of the quantizer 35 is determined.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A multi-coding apparatus for encoding input data, comprising:

a plurality of code estimators, each of said plurality of code estimators being operative to estimate amount of codes generative from a respective unit of input data when said respective unit of input data is encoded to provide a respective estimated amount of codes;

a plurality of encoders, each of said plurality of encoders being operative to encode said respective unit of input data at a respective variable rate to generate a respective unit of encoded data, and each of said plurality of encoders respectively including a memory for delaying an encoding operation of said respective unit of input data by a predetermined time period so that said respective estimated amount of codes for said respective unit of input data is generated prior to said encoding operation;

a maximum transmission rate controller for generating a total allocated amount of bits for said input data as a function of the amount of encoded data generated by said plurality of encoders; and a bit allocator for controlling said respective variable rate of a respective encoder as a function of said respective estimated amount of codes and said total allocated amount of bits.

2. The multi-coding apparatus according to claim 1 wherein said input data are supplied from a plurality of channels and are displayed simultaneously on one image plane.

3. The multi-coding apparatus according to claim 2, wherein said bit allocator includes a ratio calculator for calculating said respective variable rates for each of said encoders as a function of said respective estimated amount of codes.

4. The multi-coding apparatus according to claim 3, wherein said bit allocator includes a bit allocation calculator for allocating an amount of bits to each of said plurality of encoders as a function of said respective variable rates.

5. The multi-coding apparatus according to claim 1, further comprising a multiplexer for multiplexing respective units of encoded data; and wherein said plurality of data from said plurality of channels are displayed as sub-pictures on a plane.

6. The multi-coding apparatus according to claim 1, wherein each of said plurality of code estimators calculates entropy of said respective unit of input data to generate said respective estimated amount of codes.

7. A method for encoding input data, comprising the steps of:

estimating amount of codes generative of a respective unit of input data when said respective unit of input data is encoded to provide a respective estimated amount of codes;

storing said respective unit of input data for delaying an encoding operation of said respective unit of input data by a predetermined period of time so that said respective estimated amount of codes for said respective unit of input data is generated prior to said encoding operation;

encoding said respective unit of input data at a respective variable rate to generate a respective unit of encoded data;

generating a total allocated amount of bits for said plurality of input data as a function of the amount of encoded data generated by said plurality of encoders; and controlling said respective variable rate as a function of said respective estimated amount of codes and said total allocated amount of bits.

8. The method according to claim 7, wherein said input data are supplied from a plurality of channels and are displayed simultaneously on one image plane.

9. The method according to claim 8, wherein said step of controlling calculates said respective variable rates for generating codes as a function of said respective estimated amount of codes.

10. The method according to claim 9, wherein said step of controlling allocates an amount of bits to said respective unit of input data as a function of said respective variable rates for generating codes to provide a respective allocated amount of bits; and wherein said step of encoding encodes said respective unit of input data without exceeding said respective allocated amount of bits.

11. The method according to claim 7, further comprising the step of multiplexing respective units of encoded data; and wherein said plurality of data from said plurality of channels are displayed as sub-pictures on a plane.

12. The method according to claim 7, wherein said step of estimating calculates entropy of said respective unit of input data to generate said respective estimated amount of codes.

* * * * *